United States Patent [19]
Werntz

[11] 3,831,782
[45] Aug. 27, 1974

[54] DRUM OR BARREL PALLETIZER APPARATUS
[75] Inventor: Charles W. Werntz, Ferguson, Mo.
[73] Assignee: Alvey, Inc., St. Louis, Mo.
[22] Filed: June 11, 1973
[21] Appl. No.: 369,068

[52] U.S. Cl............... 214/6 P, 214/1 BD, 214/1 Q, 198/22 R
[51] Int. Cl. ..................................... B65g 57/28
[58] Field of Search.......... 214/1 BD, 1 Q, 6 C, 6 P, 214/7; 198/20 R, 22 R, 45; 193/36, 39

[56] References Cited
UNITED STATES PATENTS
3,070,240  12/1962  Barriol .............................. 214/6 C
3,402,831  9/1968  Coombe ............................ 214/6 P
3,434,602  3/1969  Vann .................................... 214/7

FOREIGN PATENTS OR APPLICATIONS
251,808  5/1964  Australia............................ 214/6 C Primary Examiner—Robert J. Spar
Assistant Examiner—Leslie J. Paperner
Attorney, Agent, or Firm—Gravely, Lieder & Woodruff

[57] ABSTRACT

A palletizer for large heavy drums or barrels which avoids the necessity for employing hoist devices by relying on the much simpler handling apparatus for tilting the drums or barrels to an over-center stable position on a track that is slanted sufficiently to cause the drums or barrels to roll from a receiving station to a pallet loading station. Each of the receiving and loading stations is provided with a tiltable portion of the slanted track, and that portion of the track in the loading station is tiltable to return the drums or barrels to an upright normal position.

15 Claims, 13 Drawing Figures

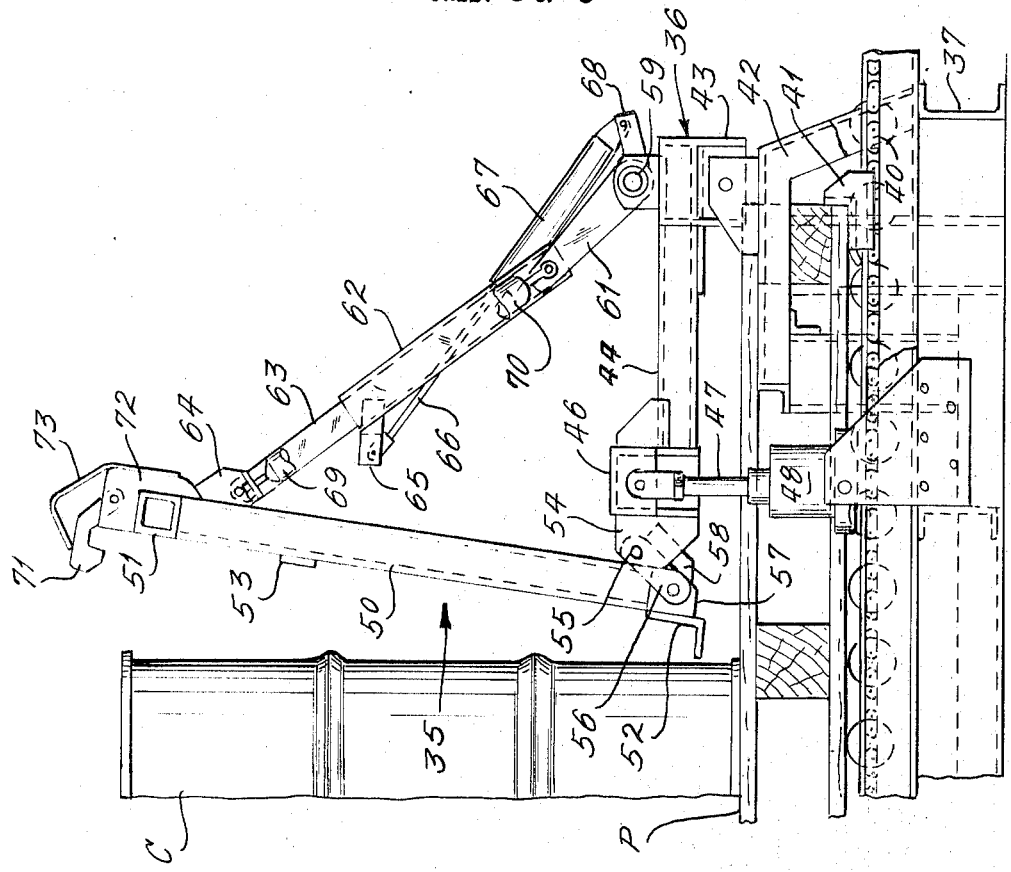
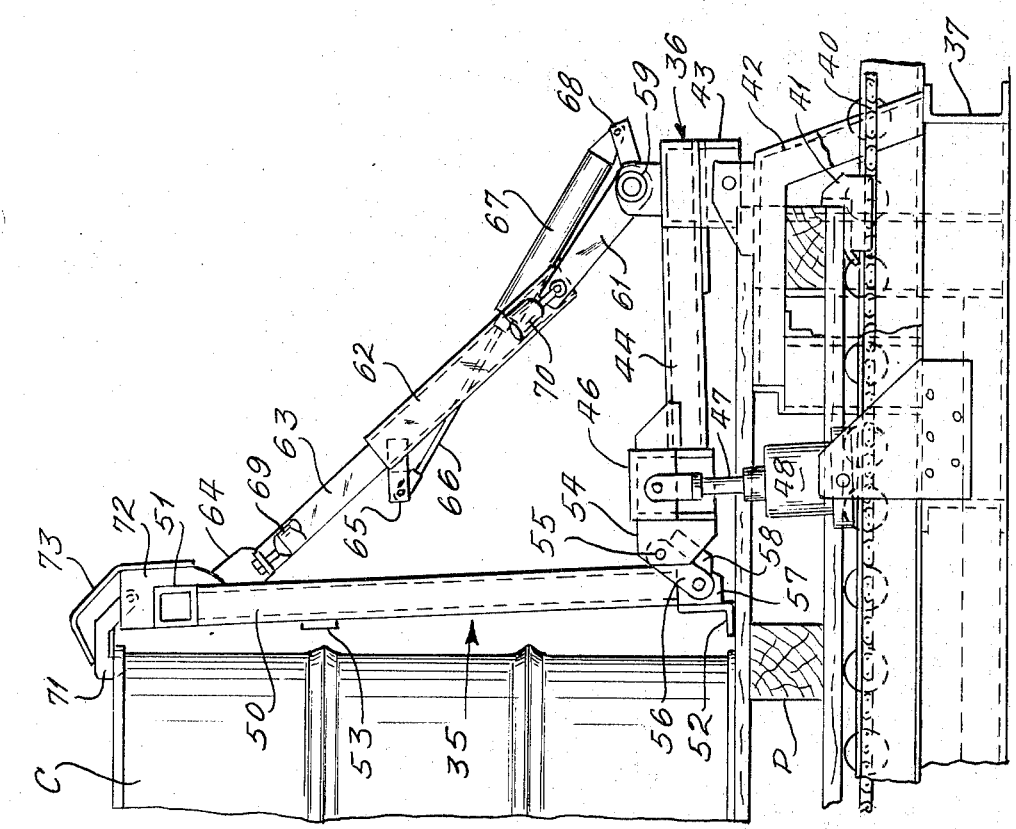
FIG. 8
FIG. 7

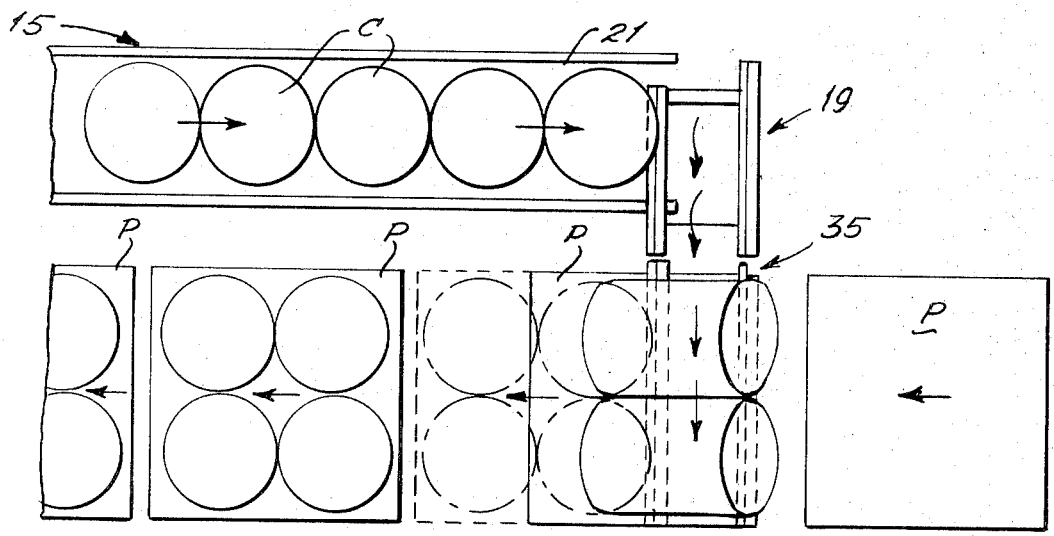
FIG.10
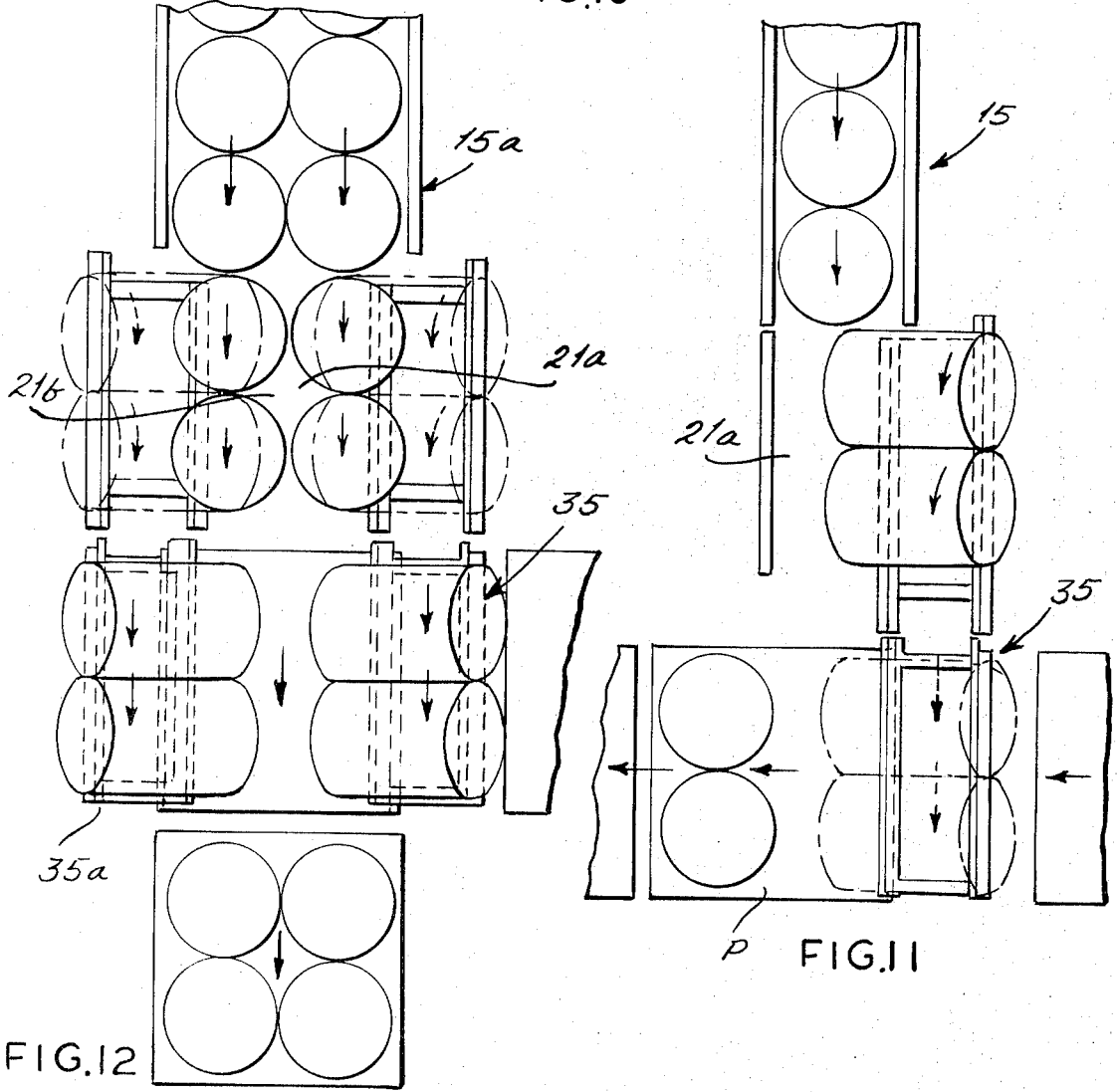
FIG.11
FIG.12

DRUM OR BARREL PALLETIZER APPARATUS

BACKGROUND OF THE INVENTION

This invention is concerned with novel apparatus for palletizing heavy drums, barrels or generally cylindrical containers.

Heretofore containers destined for loading on pallets have been handled by grab devices moving on an overhead track, or by an elevator structure for moving the containers from one level to another. These prior structures are expensive, require a space consuming area, and are sometimes difficult to service. Overhead tracks and elevators require sturdy structures which are hard to maintain in operating condition due to the heavy loads imposed thereon. Furthermore, such prior apparatus is often times too slow for efficient handling of large numbers of containers.

On the other hand, the present palletizer apparatus embodies the simple, high capacity approach to handling heavy cylindrical containers by tilting containers into a stable over-center position on a slanted track for rolling transition from a receiving station to a pallet loading station, whereupon reverse tilting movement with the aid of gravity and the weight of the containers, results in depositing the containers on a prepositioned pallet. The pallets are moved into positions such that at least two containers at a time can be deposited, and the operation of loading the pallet is timed such that the succeeding containers at the receiving station may be made ready for the initial tilting operation. Therefore, the uniqueness of the present apparatus is exemplified by its ability to operate at an efficient rate and with a minimum of delay.

The important objects of the present invention are to provide palletizing apparatus for handling heavy cylindrical containers at near floor level, to avoid hoist equipment, to utilize the principle of tilting and rolling the containers between the receiving and loading stations, and to operate in a substantially continuous manner.

A preferred embodiment for the palletizer apparatus consists in feeding the containers onto a tiltable section of conveyor where the containers are tilted into a stable over-center position onto a tilted track, rolling the containers into a position over a prepositioned pallet, collecting two or more containers adjacent the pallet loading station, reversely tilting the containers into the normal upright position directly on a pallet, and advancing the pallet to receive further containers while simultaneously handling succeeding containers for rolling transistion from the receiving station to the pallet loading station.

A preferred embodiment for the palletizer apparatus may consist also in apparatus for palletizing cylindrical containers, the combination which comprises: a pair of aligned tracks cooperatively sloped so that a cylindrical container can roll from one track to the other track of said pair; means supporting said pair of tracks in substantially matching tilted positions such that cylindrical containers on said tracks are supported in stable over-center positions to remain on said tracks; first supporting means mounting one of said pair of tracks in a position to receive containers tilted onto said track from upright positions; second supporting means operably connected to the other of said pair of tracks to support and tilt said track and containers in a direction to return the containers to upright position; and means to deliver a pallet to a position adjacent said other of said pair of tracks to receive the containers in upright position.

Other embodiments of the present apparatus may comprise adjacent receiving and discharge tracks normally in the same tilted positions so that the tracks line up and also define a slanted path of travel for cylindrical rollable objects, means to bring the objects to the receiving track and to tilt the objects onto the receiving tracks where the objects are then able to roll along the slanted path to the adjacent discharge track, means to supply pallets to receive the objects, means for moving the discharge track from its normally tilted position toward a more upright position where the effect of gravity will help tip the objects to the upright position with the rolling axis nearly vertical, and simple control means to process the objects through the apparatus with a minimum of delay.

BRIEF DESCRIPTION OF THE DRAWINGS

The presently preferred embodiments of the container palletizing apparatus are disclosed in the accompanying drawings, wherein:

FIG. 7 is a view similar to FIG. 6 but showing the tilting mechanism in a position for release of the containers;

FIG. 8 is still another view similar to FIG. 7 with the tilting mechanism released from the containers and on its way back to the initial positions of FIG. 3;

FIG. 10 is a schematic plan view of the apparatus seen in more detail in FIG. 1;

FIG. 11 is a schematic plan view of a modified arrangement for the present apparatus;

FIG. 12 is a schematic plan view of yet another arrangement for the present apparatus.

DESCRIPTION OF THE CONTAINER HANDLING APPARATUS

Figure 1:
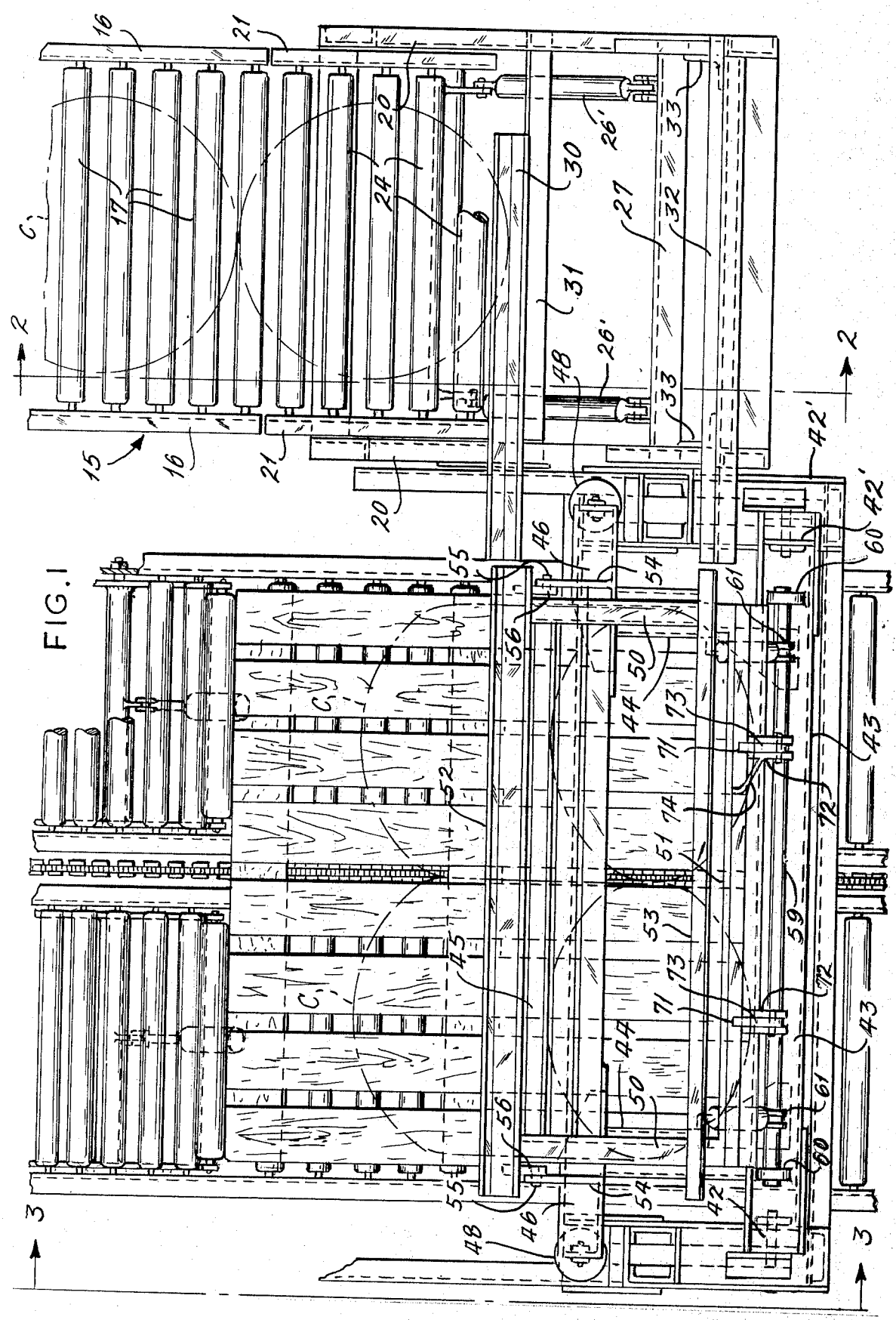
FIG. 1 is a fragmentary plan view of a container palletizing apparatus showing the container receiving station and pallet loading station in adjacent relation.
Figure 2:
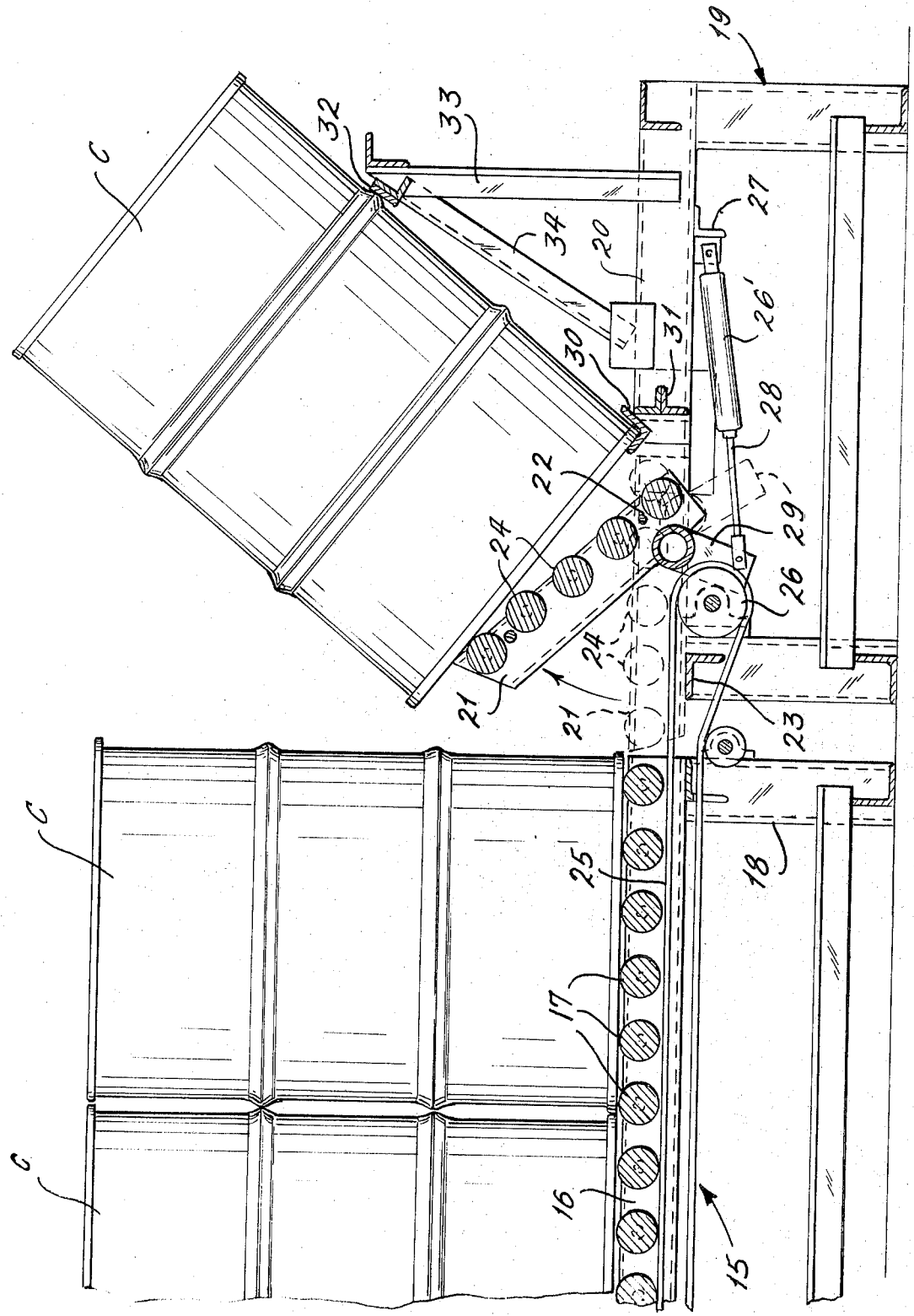
FIG. 2 is a partial sectional elevational view of the container receiving station to show the tilting operation of the containers into a stable over-center position for rolling transition, the view being taken at line 2—2 in FIG. 1.

In FIGS. 1 and 2 it may be seen that the present apparatus consists of a live roller conveyor 15 in which suitable side rails 16 support an array of rollers 17, the side rails being, in turn, supported in a floor supported stand 18. Adjacent the end of the rails 16 is a floor supported stand 19 having spaced side rails 20 fixed at an elevation corresponding with side rails 16. A pair of short length side rails 21 are positioned between the fixed rails 20 and have pivot connection at 22 (FIG. 2) with the fixed rails 20. Normally the short side rails 21, remote from the pivots 22, rest on a transverse member 23 in the stand 19. These short side rails 21 support an array of live rollers 24 at an elevation to be level with the first mentioned array of rollers 17. The array of rollers 17 and 24 are driven by a suitable endless friction belt 25, one end of which belt traverses an idler pulley 26 mounted in bearings carried by the outside fixed side rails 20. In this manner the belt is powered by motor means (not shown) to run with its top pass toward the left in FIG. 2, which direction causes the array of rollers 17 and 24 to turn clockwise, thereby moving the containers C rightwardly onto rollers 24.

The fixed stand 19 for the pivoted array of rollers 24 carries a pair of pneumatic actuators 26' having the base end of the cylinders pivotally anchored by brackets on a transverse member 27 of the stand 19. The actuating rods 28 (one being seen in FIG. 2) are operatively connected to a lever 29 fixed at a suitable angle to the side rails 21 below the pivots 22. When the actuator rods 28 are extended the rollers 24 are pivoted to the position shown in full line in FIG. 2.

Figure 3:
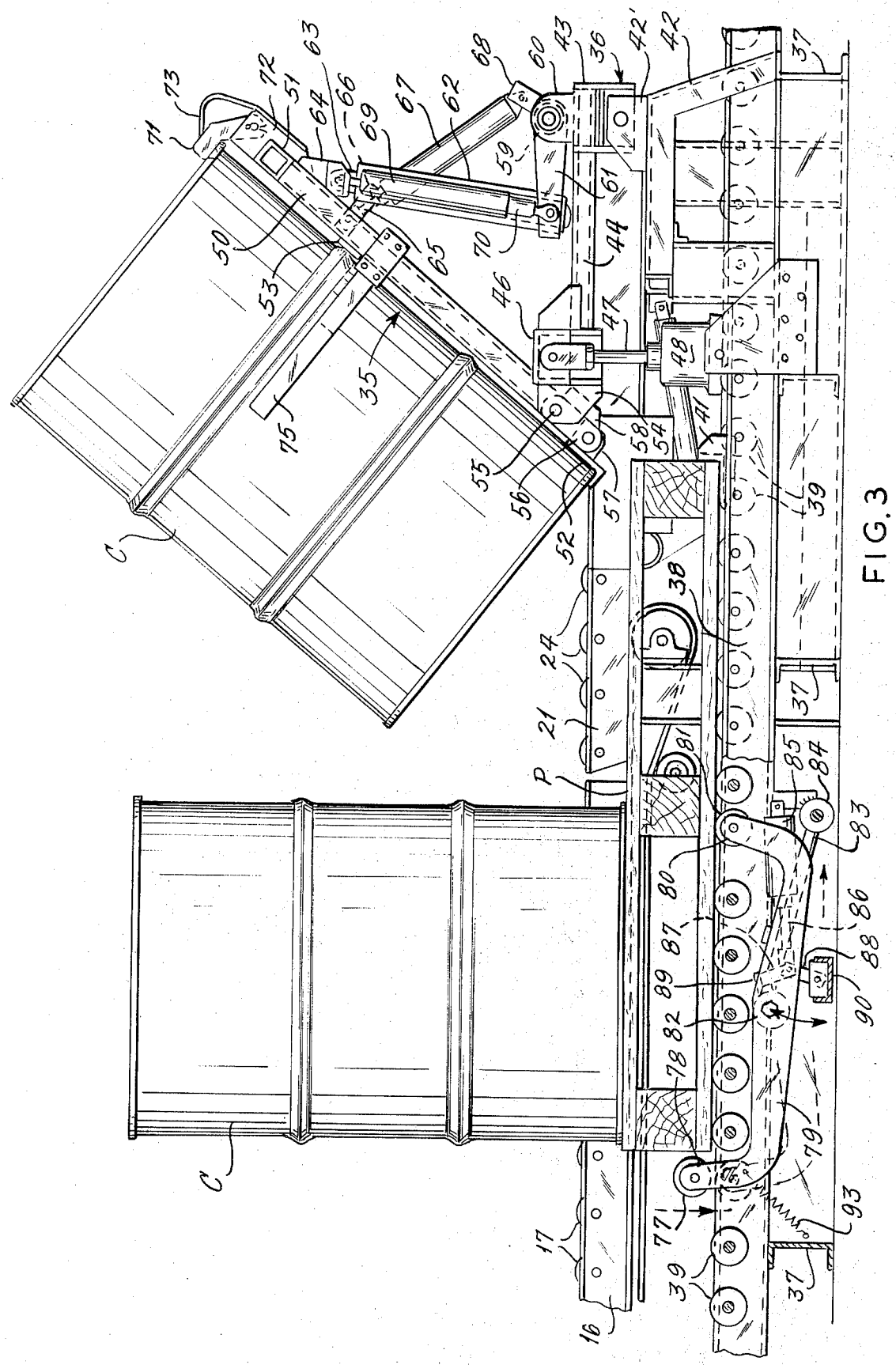
FIG. 3 is a side elevational view of the pallet loading station, the view being taken at line 3—3 in FIG. 1.

As a container C is received on the tiltable array of rollers 24, its leading bottom edge is received in a bottom angle iron rail 30 supported by a transverse member 31 of the stand 19. The upper portion of the container C is received on a flat surface rail 32 carried by a superstructure consisting of vertical columns 33 and angled braces 34. The superstructure is attached to the stand 19, and the rails 30 and 32 form a track horizontally directed at a slope such that each tilted container C will automatically roll leftwardly (FIG. 1) while the tilted array of rollers 24 returns to the down position for the next succeeding container C. While the tilted rollers 24 are in the raised position the powered belt 25 is caused to slide under the rollers 17 as the next container C is stopped against a movable stop S (FIG. 3). A suitable control (not illustrated) is incorporated in the apparatus to perform the power interruption for the belt 25.

In FIG. 3 the container C rolling from the receiving station defined by the rails 30 and 32 is received in an adjacent tiltable frame mechanism 35 operatively mounted on a floor supported stand 36 which constitutes the loading station for pallet P. The stand 36 is made up of a series of transverse members 37 on which are secured two sets of parallel longitudinal side rails 38, and each set supports parallel arrays of rollers 39. As may be seen in FIG. 9, there are four side rails 38 arranged in pairs to support two sets of rollers 39 spaced apart to provide a center space for the operative mounting of a drag chain having spaced drag lugs 41 thereon to engage the pallets P for advancing each pallet from right to left as seen in FIG. 3.

Still referring to FIG. 3, and where appropriate, to FIG. 1, it can be seen that the stand 36 consists of a pair of fixed frame structures 42 which are outside the two rows of rollers 39. Each frame 42 supports a pivot bearing 42' for the mounting of a rear transverse bridge member 43. Forwardly extending arms 44 fixed to the bridge member 43 are connected at the forward portions by a transverse member 45 which is generally parallel to the bridge 43. Laterally outwardly extending from the arms 44 are box structures 46 fixed to the arms 44, and each box structure 46 is connected to the vertical rod 47 (FIG. 3) of a pneumatic motor cylinder 48, whereby the arms 44 and the transverse member 45 may be lifted or lowered as desired. The member 43, arms 44 and transverse member 45 constitute a horizontal pivotal frame which carries the superstructure or frame 35 which is itself tiltably mounted on the transverse member 45.

The frame structure 35 comprises a pair of angled side members 50 connected near the upper ends by a transverse member 51, at the lower ends by an angle track or rail 52. The rail 52 is slanted or inclined to match the slant of and cooperate with the previously described rail 30. At a distance below the upper member 51, the frame 35 carries a flat rail 53 which is aligned with the previously described rail 32, and the rail 53 is slanted so as to be parallel with the bottom rail 52. Thus, the rails 52 and 53 make up a track cooperating with the previously described track consisting of rails 31 and 32. These rails make up a pair of tracks aligned and cooperatively sloped to cause cylindrical containers to roll from one track to the other track.

The frame structure 35 is operatively tiltable in the following manner. Each box structure 46 (FIG. 1) is provided with a fixed bracket plate 54 which carries a pivot 55 for the upper end of an articulation link 56. The outer end of each link 56 is pivotally connected to a bracket 57 (FIG. 3) fixed to the rear surface of the angle rail 52. As seen in FIG. 3, the link 56 rests against a stop 58 fixed to the bracket 54. Running lengthwise on top of the frame member 43 is a torque shaft 59 carried in bearing blocks 60. The torque shaft 59 has fixed thereto arms 61 which extend forwardly to support the lower ends of a telescoping link 62 (FIG. 4), and the upper end of this link is open to receive its mating telescoped link 63. The outer end of link 63 is connected by a bracket 64 to the rear side of the angled side members 50 of the tiltable frame 35. Each telescoping link 62 carries a fixed arm 65 which serves as the pivotal connection for the outer end of a pneumatic motor rod 66 working in a cylinder 67. The base of the cylinder 67 is secured to an arm 68 fixed on the torque shaft 59 adjacent the arm 61. A shock cylinder 69 has its upper end fixed to the bracket 64 on the frame member 50 and its piston rod 70 is pivoted on the arm 61. The cylinder 67 is double acting so it may function for both tiltng and retracting the frame 35, and by connecting its rod 66 to the arms 65 an exceptionally long stroke is avoided. The shock cylinder 69 is provided to check or snub the forward tilting of the frame 35 when setting the containers C down upon the pallet P. In this direction of movement as soon as the container center of gravity is brought within its base the frame 35 wants to move faster than the action of cylinder 67 will normally allow. Hence, the cylinder 69 is needed to check this tilt of frame 35. The reverse movement is free of the load of containers and does not require checking action by the shock cylinder 69.

It can be seen in FIG. 3 that the frame top transverse member 51 carries a pair of hook elements 71 mounted thereon by support brackets 72. Each hook element is urged forwardly by a spring element 73 so as to drive the hook 71 over the top rim of a container. In order to allow the first container of a pair received in the frame 35 to pass the first hook element 71, (the righ hand) hook 71 is provided with a lifter arm 74 (FIG. 1) formed in such manner that it is engaged by the rim of the rolling container to lift the hook 71 during container passage. Thus the first container C will pass to the end of the frame 35 and be stopped by an arm 75 (FIG. 3). In this manner the first container acts as a stop for the following, and a pair of containers C can be accumulated on the tiltable frame 35 with the lower rims seated in the rail 52 and the upper rim secured by being engaged under the hook elements 71.

Figure 4:
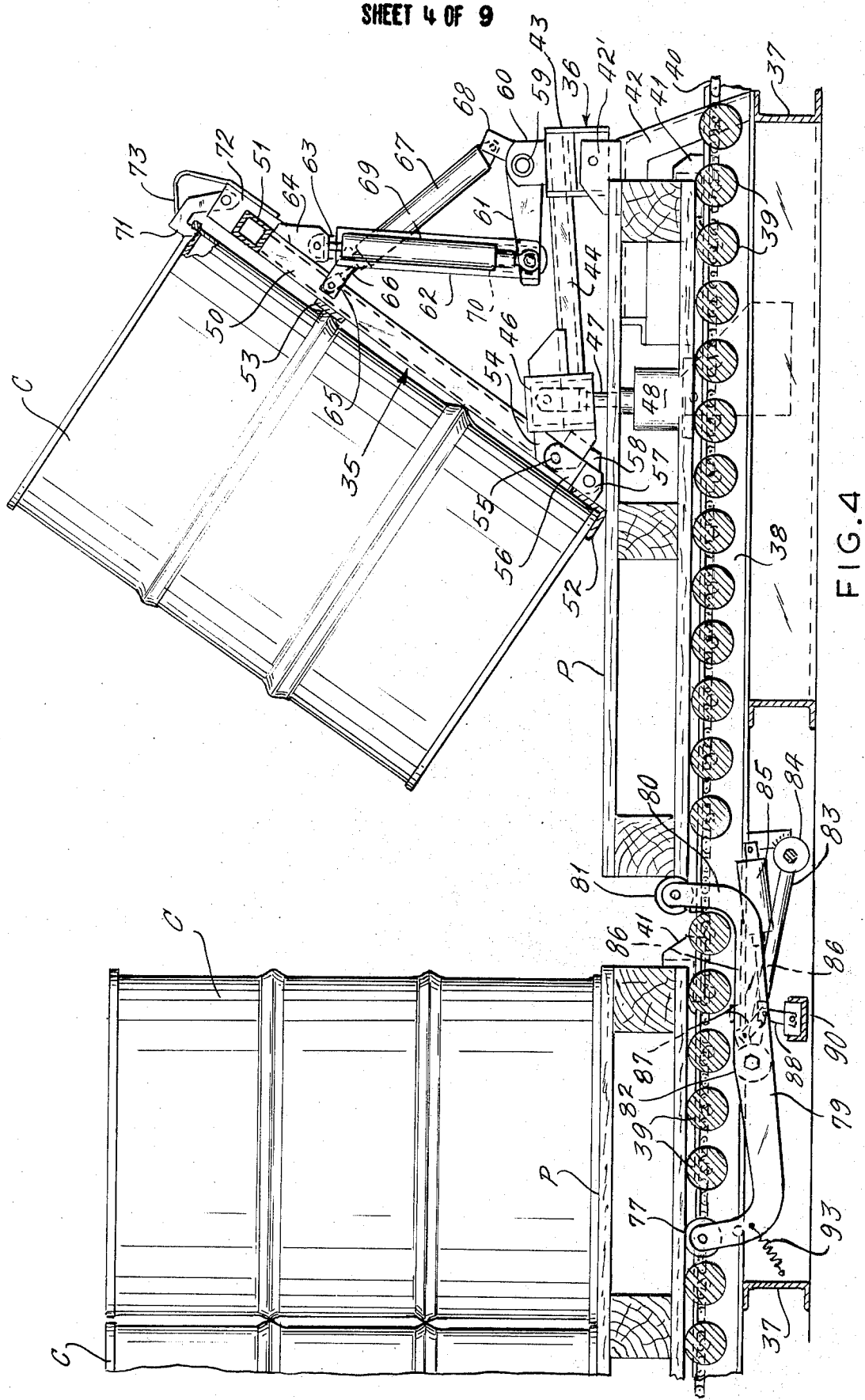
FIG. 4 is a side view of the pallet loading station mechanism in a preliminary condition for tilting containers onto a pallet.
Figure 5:
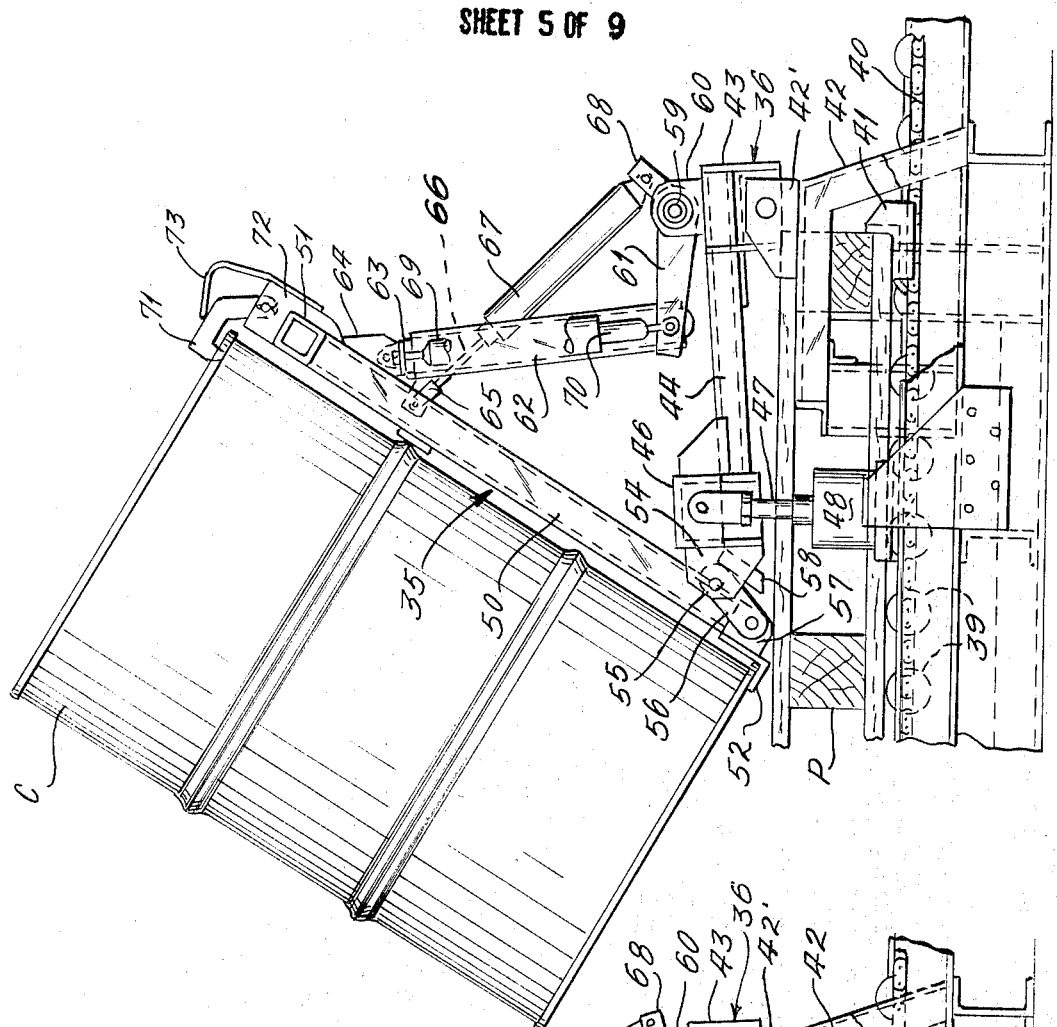
FIG. 5 is a side view of the pallet loading mechanism in a condition more advanced toward pallet loading than the view of FIG. 4.
Figure 6:
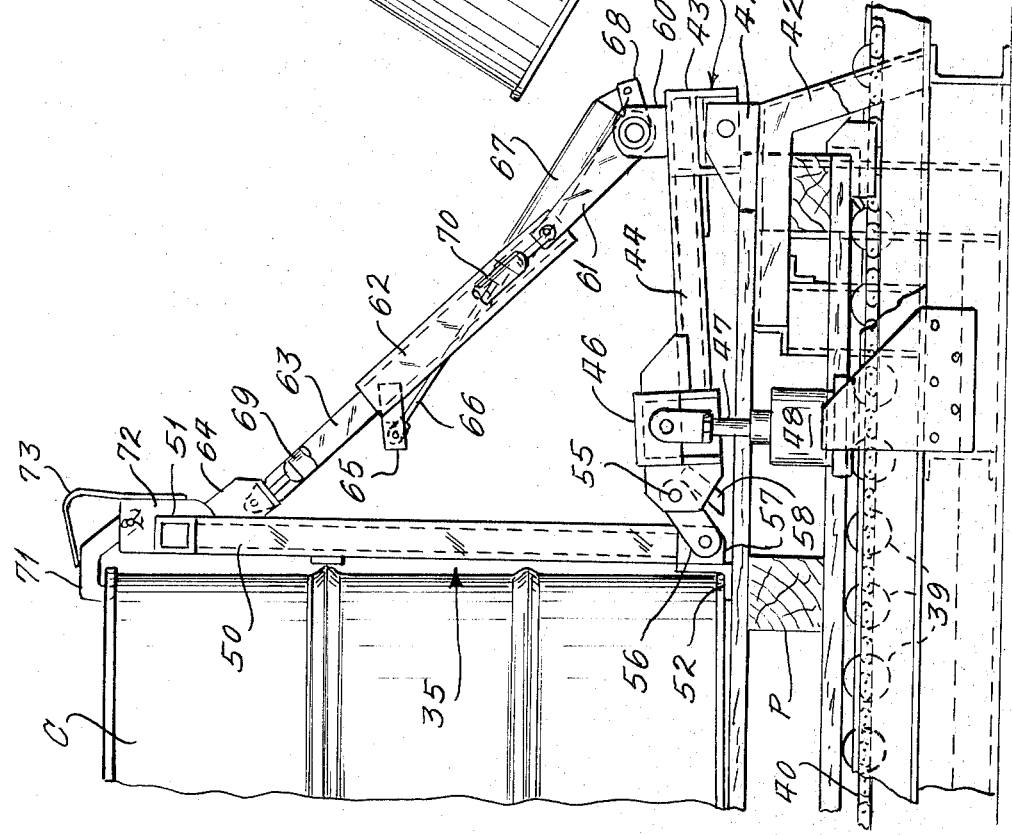
FIG. 6 is a view similar to FIG. 5, but in a still further advanced condition for pallet loading.

Turning now to FIGS. 4 to 6, the operation of the tiltable frame 35 can be observed in several stages of unloading containers onto a prepositioned pallet P. These views are illustrative of the action of the various components provided to pivotally raise or tilt frame 35 forward to unload containers. In FIG. 3, the frame 35 is in its inclined initial position with the containers C in stable over-center position. This means that the containers will retain the position because the center of mass is off-center or to the right of the bottom rim seated on the angle rail 52.

The initial unloading movement (FIG. 4) is to apply the fluid pressure to the cylinders 48 so the track 52 is lowered onto the pallet P, and when the pressure reaches a prescribed value then the motor cylinders 67 may be energized to begin moving the frame 35 toward its erect unloading position. This action of motor cylinders initiates rotation of the torque shaft 59 in a direction to cause the arms 61 to lift the telescoping numbers 62, 63 upwardly to begin tilting of the frame about its pivotal connection on link 56 near the angle rail 52. The described action is shown to have occurred in FIG. 5. By arranging the motor cylinder 67 and the telescopic members 62, 63 in the manner described, it is possible to use a normal length of stroke for the rod 66 of the motor cylinder, and to gain the needed length of stroke by the arm 61 and telescopic members 62, 63.

Once the container center of mass moves to the left of the bottom rail 52, the mass of the containers will immediately provide the energy to continue tilting the frame 35 to the left. At this point, the tilting of the frame 35 will continue against the restraint imposed by the shock cylinder 69 which exerts its resistance to rapid elongation. By comparing FIG. 5 and 6 it will be evident that the operation of the motor cylinder 67 is applied to the arm 65 fixed to the upper end of the telescopic member 62. Also, the shock cylinder 69 operates between the arm 61 on the torque shaft 59 akd the bracket 64 on the frame 35. Neither of these units 67 and 69 is required to span the total distance from the torque shaft 59 and the full upward tilt of the frame 35, but each shares some of that distance, as shown in FIG. 6.

Once the containers are tilted uprightly by the frame 35 it is necessary to release the hooks 71 so the frame 35 can be returned to its initial tilted position (FIG. 3). Therefore, it is necessary to have a way to pull the bottom angle rail 52 away from the bottom edge of the containers in order to release the upper hooks 71. It can be observed in the progression of movements shown in FIGS. 3, 4, 5, and 6 that the bottom angle rail 52 engages on the top pallet P and begins to slide forward causing the link 56 to break its retracted position. Concurrently, the motor means 48 draws the frame 35 down on the pallet P. As the movement continues, the bottom rail 52 reaches a position where it is flat on the pallet (FIG. 6). Now it is necessary to release the upper hooks 71 but the distance from rail 52 to the hooks 71 is fixed to match the length of the containers being palletized. To obtain release, the motor means 48 is actuated to raise the frame 35, and this movement (FIG. 7) operates to draw on the link 56 which now pulls the angle rail 52. Thus, for the moment, the frame 35 pivots off the top edge of the container while the rail 52 is pulled free, and thereafter the lifting effort by motor means 48 on the frame 35 releases the hooks 71.

DESCRIPTION OF THE PALLET POSITIONING APPARATUS

Figure 9:
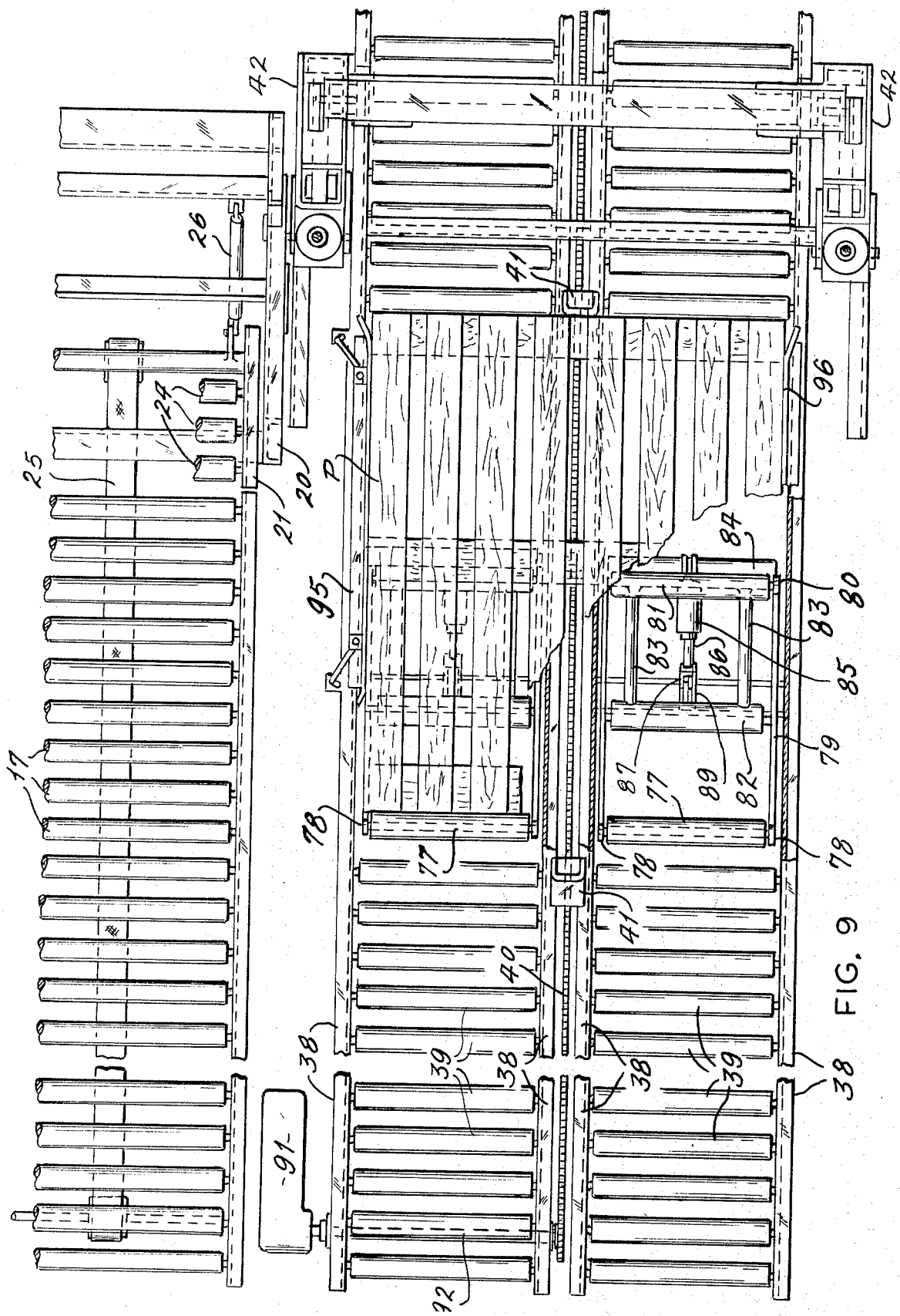
FIG. 9 is a fragmentary plan view of the conveyor apparatus in the pallet loading station with certain parts broken away, the view showing the pallet positioning mechanism and pallet advancing drag chain.

The means for locating the pallets P and for transporting the same are shown best in FIGS. 3, 4 and 9. In FIG. 3, the leading end of the pallet P which moves to the left is engaged by a roller 77 mounted between the upturned ends 78 of double ended escapement levers 79. The opposite end of each lever 79 has an upturned end 80 to support a roller 81. The middle portion of the levers 79 are pivoted to the ends of a transverse shaft 82. The shaft 82 floats upon a pair of radius links 83 having the rightward ends connected to a pivot forming member 84 fixed to the side frames 38 so that the radius links 83 pivot about the member 84 and raise or lower the middle portion of the double ended levers 79. The raising and lowering action is achieved by a pneumatic motor cylinder 85 having its piston rod 86 connected to the common connection of a pair of links 87 and 88. The link 87 is connected by bracket 89 to the shaft 82, and the cooperating link 88 is connected to a fixed support 90.

The operation of the pallet positioning means can be seen in FIGS. 3 and 4. First, it is understood that the drive motor 91 (FIG. 9) through shaft 92, drives the chain 40 on which the pallet drag lugs 41 are mounted. The motor 91 is of pneumatic type and runs constantly unless stalled by the rollers 77 or 81 getting in the way of a pallet P. In FIG. 3, the pallet P is arrested by the roller 77 being held above the top plane of the rollers 39. This position is accomplished by extending the links 87 and 88 to lift the shaft 82. Since the roller 81 is held down under the pallet P, the opposite roller 77 is forced up against the restraint of a spring 93. While the roller 77 is held up in the path of the pallet, the pallet drag chain 40 is stalled and cannot advance.

A suitable control (not shown) can be used to reverse operation of the motor cylinder 85 to jackknife or fold the links 87, 88 and lower the pivot shaft 82 for lowering the levers 79. This action lowers the roller 77 and the lowering action is maintained just long enough to allow the pallet P to advance over the roller 77. After release of the pallet P the shaft 82 is again urged toward raised position.

Since both rollers 77 and 81 are now under a pallet P the shaft 82 cannot raise up. However, (FIG. 4) when the trailing end of a pallet P passes beyond the roller 81, the shaft 82 immediately raises up to project the roller 81 into the space between two pallets.

Normally without a pallet being present, the spring 93 will hold the lever ends 78 down and allow the opposite ends 80 to lift thereby projecting the roller 81 into the path of movement of a pallet P. When the motor cylinder 85 is operated momentarily to jackknife the links 87, 88 the levers 79 are dropped so that both rollers 77 and 81 are, for the moment at least, dropped from the path of pallet movement. It is appreciated that the levered means described in FIGS. 3 and 4 is duplicated for each row of rollers 39 (FIG. 9) to achieve proper stopping alignment of each pallet P. As can be seen also in FIG. 9, the pallets P are guided into and through the container loading position between fences 95 and 96.

DESCRIPTION OF APPARATUS MODIFICATIONS

In FIG. 10 there is shown diagrammatically the plan view of apparatus already described. To review briefly, containers C are conveyed on feed conveyor to a track frame that is in a tilted conditon (FIG. 2). From that tilted frame the containers roll into a frame 35 which is tilted in a reverse direction to set the containers, two at a time, down on a pallet P prepositioned by the means of FIGS. 3 and 4 to two positions for taking on a pair of containers at each position to finally move on with four containers thereon. In FIG. 10, the conveyor for bringing containers in and for conveying loaded pallets are essentially parallel.

In FIG. 11, the same essential apparatus can be arranged such that the conveyor 15 feeds containers onto a tiltable conveyor section 21a that tilts to one side. The containers roll onto a reversely tiltable frame 35 to restore the containers to upright position on a pallet.

FIG. 12 is a variation of the apparatus of FIG. 11 in that right and a left hand pallet loading apparatus are combined to handle containers from both sides of a pallet and put four containers on a pallet simultaneously. For example, a wide feed conveyor 15a brings containers onto tiltable conveyor sections 21a and 21b. The containers roll down into a tiltable frame 35 and 35a which deposit the load onto a pallet.

THE CONTROL SYSTEM

Figure 13:
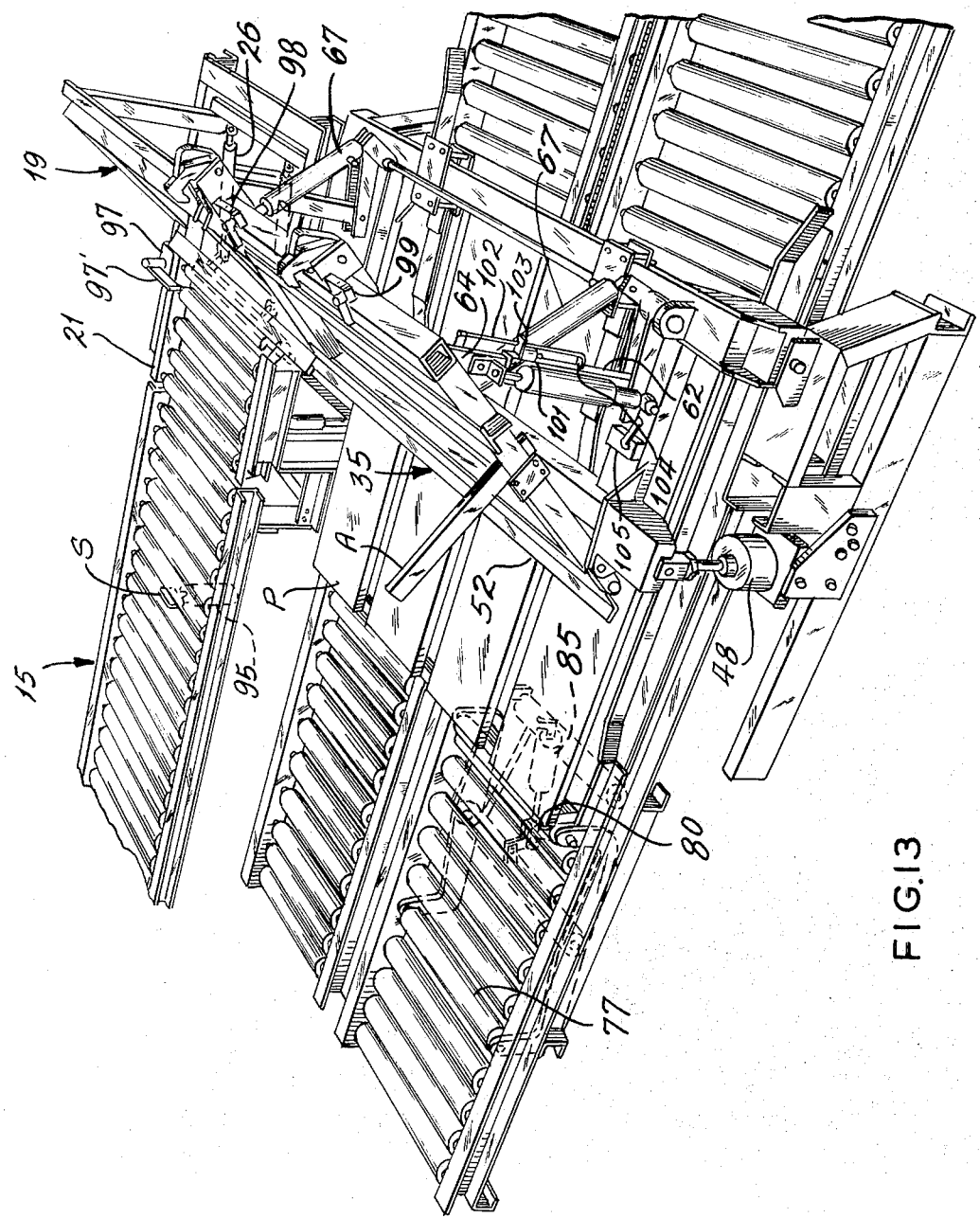
FIG. 13 is a schematic view of a control system for the apparatus of FIG. 1 in particular but which is adaptable for other embodiments of the apparatus herein described.

Fig. 13 is a schematic diagram of a control system for the apparatus of FIG. 1. This system, of course, can be adapted to the embodiments of apparatus seen in FIGS. 11 and 12. The infeed conveyor 15 is provided with a drum stop S which is raised and lowered by a motor cylinder 95 so that the stop S moves relative to the path of the bottom rim of a drum then in position to pass from conveyor 15 to the tilting conveyor section 21. The drum that moves onto the tilting section 21 actuates a sensor 97 through its feeler arm 97'. The sensor 97 through suitable pressure air lines (not necessary to show) signals the motor cylinder 95 to raise the stop S and hold back the drum next trailing the drum about to be tilted onto the tracks 19. At the same time the sensor 97 signals the tilting motor means 26' to tilt the lead drum onto the tracks 19 where it automatically rolls down the track incline onto the tracks of the tilting frame 35.

The rolling drum passes a sensor 98 which it deflects only momentarily and rolls on to the stop arm A at the outer end of the frame 35 where it actuates a second sensor 99 to signal the motor actuator 95 for the stop S to lower and allow a second drum to be tilted onto tracks 19 for rolling passage onto the frame 35. The second drum rolling onto frame 35 actuates sensor 98 and now both sensors 98 and 99 are actuated which signals the stop motor 95 to hold up allowing any more drums to pass. Simultaneously, the motor cylinders 48 for the frame 35 are energized by a suitable signal from the sensors 98 and 99 to pull the track 52 (FIGS. 3 and 4) of the frame 35 down on a pallet P. When the pressure of the fluid to motor cylinders 48 reaches a predetermined value it initiates supply of pressure fluid to the motor cylinders 67 for initiating the tilting of the frame 35 to place the two drums in the frame 35 upright on the pallet P (FIG. 6) in the sequences of movement illustrated in FIGS. 5 to 8. When the cylinders 67 are fully extended to effect transfer of the drums, a sensor 101 (see FIG. 13) on the member 62 is actuated by an adjustable rod 102 having one end attached to the bracket 64 and its body movable in a guide 103. The free end 104 of the rod 102 is aligned to contact the sensor 101 and when this takes place the sensor reverses the direction of movement of the cylinders 67 and the frame 35 is drawn back to its starting position. When in the starting position again a sensor 105 is actuated by the arm 61 to retract the drum stop S and the cylcle of events just described is repeated. During the reversal of movement of the cylinders 67 the motor cylindr 85 for the pallet stop mechanism 77 and 80 will be actuated (FIG. 4) to retract the stop roller 80 and allow the pallet P to be advanced to the position (FIG. 3) where the stop roller 77 is raised to stop the pallet P in position to receive a subsequent pair of drums. The pallet advancing chain is constantly acted on by the motor 91, but when a stop roller 77 or 80 intercepts a pallet, the motor is prevented from moving the pallet until the stop roller is depressed.

As used herein the terms cask, drum or barrel shall mean any object normally capable of being handled by the present apparatus when the object can respond to gravitational influence and roll on a guiding track for handling such objects. The present apparatus is especially useful when called upon to handle fluid filled objects, such as 55 gallon oil drums, for example, which weigh upwards of 300 pounds.

The foregoing description has been given in the light of the drawings showing mechanical and other components suitable for handling heavy casks, drums or cylindrical objects by means causing the objects to roll into position for being loaded on a pallet. The apparatus avoids any need to lift the objects, is capable of handling rollable objects rapidly, and is quite safe from the operators view point. The scope of this disclosure is not to be unnecessarily limited.

What is claimed is:

1. In apparatus for palletizing cylindrical containers, the combination which comprises: a pair of aligned track carrying frames cooperatively sloped so that a cylindrical container can roll from the track on one frame to the track on the other frame; means supporting said pair of frames in substantially matching positions tilted off the vertical so that cylindrical containers on said frames remain in tilted and stable over-center positions on the tracks; first supporting means mounting said one frame in a position to receive containers tilted onto the track thereon from upright positions; second supporting means operably connected to said other frame to support and tilt the track thereon and containers in a direction to return the containers to upright position; and means to position a pallet adjacent said other frame to receive the containers in upright position.

2. The palletizing apparatus of claim 1 wherein said second suporting means includes means supporting said other frame for pivotal displacement between tilted and upright positions, and cooperating means between said supporting means and said other frame to move said frame between said positions and to cushion the frame displacement under the influence of the shift in the center of gravity of the container returning from the over-center position toward upright centered position.

3. The palletizing apparatus of claim 1 wherein said pallet delivery means includes a conveyor running adjacent said second supporting means, and tiltable-swingable means in said conveyor alternating in releasing and holding a pallet in container receiving position.

4. The palletizing apparatus of claim 1 wherein said second supporting means includes a fixed rail for engaging the bottom periphery of a container, a device for engaging the top of a container and means to displace said second supporting means between a position in which said fixed rail and device are simultaneously engaged with a container while returning the container to upright position and a position in which said fixed rail is withdrawn from engaging the container to release the container 5. Apparatus for palletizing cylindrical containers, the apparatus consisting of: first means to tilt a container from an upright position into a stable overcenter position, a container supporting track sloped in one direction to cause the container tilted onto the track to roll; a frame and track structure cooperatively aligned with said supporting track to receive the tilted rolling container; means to located a pallet adjacent said frame and track structure; first operating means connected to said structure adjacent a pallet to move said frame and track structure between a generally vertical upright position supporting the container on a pallet and a position withdrawn from container support such that the container is released for support directly on a pallet; and container unloading means operative on said structure to effect container return to the upright position.

6. The apparatus of claim 5 wherein said unloading means includes means operable to move said frame and track structure between tilted and upright positions, and motion snubbing means adjacent said first operating means to snub the frame motion as the tilted over-center container position returns to the generally right position.

7. The apparatus of claim 6 wherein said first operating means is connected to said snubbing means to actuate said snubbing means into a position where the mass of a container completes the return of the container to upright position from tilted position.

8. The apparatus of claim 5 wherein said pallet locating means includes a conveyor to move pallets, motor means constantly driving said conveyor, and escapement mechanism in the path of pallet movement to engage the leading end of the same pallet in each of two positions of said mechanism, thereby effecting pallet advance in a step-by-step advance, said escapement mechanism including arm means having pallet stops adjacent the opposite ends with the arm length between stops determining the pallet advance distance.

9. In apparatus for palletizing cylindrical objects, the combination of normally aligned frames having the same positions tilted to one side of the vertical, track means on each frame to engage and support the cylindrical objects on said tilted frames, means to tilt load the cylindrical objects onto one of said frames, said one frame being sloped to cause the cylindrical object to roll onto the other of said frames, a pallet support adjacent and below said other frame in position to locate a pallet to receive the cylindrical objects, said other frame and track means thereon being operatively movable between said tilted position and a generally vertical cylindrical object unloading position, means operatively connected to said other frame to move the same between said positions, and an array of sensor devices in said apparatus to control a predetermined sequence of operations including the tilt-loading of cylindrical objects onto said one frame and the tilt-unloading onto a pallet.

10. The apparatus of claim 9 wherein said tilt of said frames is at an angle to receive the cylindrical objects in a stable center of gravity over-center position, and said operable means to tilt the cylindrical objects back to the vertically erect position includes a cushioning device to check the exertion of the cylindrical object as it is returned to the erect position.

11. The apparatus of claim 9 wherein said means to move said other frame between said positions includes means to withdraw said support track from engagement with the cylindrical objects.

12. In apparatus for palletizing cylindrical objects, the combination of a first horizontal conveyor for moving the objects in an upright position on one end, a second conveyor adjacent said first conveyor for moving pallets into a position to be loaded with the objects, and means interrelating said first and second conveyors for the transfer of objects onto a pallet, said interrelating means including a first frame aligned with said first conveyor and providing a track tilted off the vertical, a second frame aligned with said second conveyor and providing a track tilted off the vertical, said frame tracks being aligned to pass objects therebetween and having a slope such that objects roll down the slope on said tracks, means included in said first conveyor to tilt the objects onto said first frame track, and means operatively connected to said second frame to swing said track thereon into a generally vertical position to load the objects on pallets moved into position by said second conveyor.

13. The apparatus of claim 12 and including pallet positioning means in said second conveyor operable to locate a pallet relative to said second frame, said positioning means having selective positions to permit loading a plurality of objects onto a pallet.

14. The apparatus of claim 12 and including pallet positioning means cooperating with said second conveyor to define at least two pallet positions on said second conveyor, each of which positions presents an unoccupied pallet area adjacent said second frame.

15. The apparatus of claim 12 and including pallet positioning means comprising swinging levers, pallet stops on said levers spaced apart and relatively movable into positions to engage the pallets moved by said second conveyor, and means to swing said levers.

* * * * *